US005725124A

United States Patent [19]

Bustos et al.

[11] Patent Number: 5,725,124

[45] Date of Patent: Mar. 10, 1998

[54] PRODUCT VENDING AND PNEUMATIC DELIVERY SYSTEM AND METHOD

[75] Inventors: Rafael T. Bustos, Alpharetta; John D. Howard, Temple, both of Ga.

[73] Assignee: L&P Property Management Company, Chicago, Ill.

[21] Appl. No.: 571,253

[22] Filed: Dec. 12, 1995

Related U.S. Application Data

[63] Continuation-in-part of Ser. No. 449,935, May 25, 1995, Pat. No. 5,586,686, which is a continuation-in-part of Ser. No. 404,243, Mar. 15, 1995, abandoned.

[51] Int. Cl.$^{6}$ .......... B23Q 7/04

[52] U.S. Cl. .......... 221/211; 406/2

[58] Field of Search .......... 221/211, 278; 186/55, 52, 53; 406/3, 1, 2

[56] References Cited

U.S. PATENT DOCUMENTS

| | | | |
|---|---|---|---|
| 564,427 | 7/1896 | Jacques | 406/2 |
| 3,877,241 | 4/1975 | Wade | 62/137 |
| 4,284,370 | 8/1981 | Danier et al. | 406/86 |
| 5,354,152 | 10/1994 | Reinhardt et al. | 406/3 |

FOREIGN PATENT DOCUMENTS

| | | |
|---|---|---|
| 2514442 | 10/1976 | Germany . |
| 563229 | 1/1981 | Japan . |
| 2202694 | 8/1990 | Japan . |

*Primary Examiner*—Kenneth Noland
*Attorney, Agent, or Firm*—Wood, Herron & Evans, L.L.P.

[57] ABSTRACT

A system is provided for vending food products such as individually packaged beverages from a storage unit to a remote location such as a service counter or the service island of a gasoline service facility. Preferably, a pneumatic tube conveyor moves the product from storage to a dispensing unit at the remote location in response to product selection made by a customer at the remote location. Preferably, payment for the sale of the product item is coordinated with information from another vending or accounting system such as a gasoline charge system that includes a credit card reader associated with a fully automated self-service gasoline pump. The product is moved through the conveyor in a reusable carrier or in its own product packaging container that serves as a carrier. The carrier is formed with one or more annular seals to facilitate maintenance of pressure across the carrier and movement around curved sections of the tube. Where the product's container is used as the carrier, it also is preferably formed with one or more enlarged annular sealing sections. Deceleration of the product is controlled by an article actuated bypass valve that directs air moved by the moving product to bring a floating piston in the tube into gentle contact with the container to gradually slow it to a stop.

17 Claims, 9 Drawing Sheets

PRODUCT VENDING AND PNEUMATIC DELIVERY SYSTEM AND METHOD

This is a continuation-in-part of U.S. patent application Ser. No. 08/449,935, filed May 25, 1995 now U.S. Pat. No. 5,586,686, entitled "Temperature Maintained Food Dispensing System and Method", which is a continuation-in-part of U.S. patent application Ser. No. 08/404,243, filed Mar. 15, 1995, now abandoned, entitled "Temperature Maintained Beverage Dispensing System And Method", both of which are hereby expressly incorporated by reference herein.

FIELD OF INVENTION

This invention relates to the vending and handling, delivery and dispensing of individually packaged products, particularly products subject to damage by agitation, such as beverages or other items of food, and, more particularly, to the automated delivering and dispensing of beverages or other food products in their own individual packaging containers, with the containers serving as carriers for the products.

BACKGROUND OF THE INVENTION

The retail sale of beverages for immediate consumption is typically carried out either by over-the-counter sale by a server or attendant at a store or other indoor location or by mechanized unattended sale from a drink dispensing machine, which may be at an indoor or an outdoor location. Many systems and vending devices of the prior art have employed techniques to at least partially automate the vending of beverages and other food products as well as non-food products that are susceptible to damage due to rough handling and agitation. As a result, automated product delivery in systems for vending such damageable products has encountered problems. In carbonated soft drink vending machines, for example, the excessive agitation of the bottled product results in effervescence of gas upon the opening of the container. Many solid food products also require careful handling to avoid a breaking or mixing of the product in its container during delivery.

Furthermore, beverages that are to be sold for immediate consumption are usually stored at a refrigerated temperature that is several degrees above the freezing point of water. The refrigeration is most commonly achieved by cooling a storage enclosure within the store building that is otherwise maintained at a typical room temperature. In addition, in geographic locations where temperatures drop below freezing, some heating of the building that surrounds the beverage storage enclosure maintains the building at the room temperature. With outdoor dispensing machines, such machines are usually not employed at times where below freezing temperatures are expected.

Systems have been provided for the marketing of beverages such as juices and soft drinks at locations more convenient to consumers. Such locations have included many that are frequented by vehicular or pedestrian traffic, such as gas stations and entertainment facilities. These locations have included concession counters and convenience stores that have been integrated with the gas station or entertainment facility.

Outdoor retail locations such as the vehicle service islands of gas stations are increasingly being provided with payment devices such as credit card readers that are operatively connected with the vehicle service devices, such as the gasoline dispensing pumps, for use by a customer purchasing gasoline, for example, to pay for the purchase without leaving the vicinity of the vehicle. At such locations, the customer is, nonetheless, required to enter the adjacent store facility to purchase snacks or beverages. The logistics of purchasing such additional products subjects the customer to an additional inconvenience, requiring some additional time and effort, which, in a certain percentage of cases, the consumer elects to forego, resulting in a loss to the retailer of a potential sale. Furthermore, the use of card readers at self-service gasoline pumps provides the capability for completely unattended gasoline sales, with the customer delivering the purchased gasoline from the self-service pump and making automatic payment without the intervention of a service attendant. Such a capability makes possible the sale of gasoline at night or at other times when no attendant is on duty, since there is no cash that must be handled and no requirement for the added security incident to a facility at which cash will be accepted and stored. At such unattended facilities, conventional systems for providing additional products such as beverages to the gasoline customer are not readily adaptable.

The vending of sandwiches and other solid food products for immediate consumption in the facilities discussed above present similar problems. Such products must usually be contained in their individual packaging, must be protected from environmental conditions such as excess heat or cold, and are preferably cooled or heated prior to or upon vending so as to require a freezer or a heating device such as a broiler or microwave oven that is preferable not to maintain at the vending area.

Accordingly, there is a need in the retailing industry, particularly for the sale of cool beverages, or temperature maintained, cooled or heated food items at locations such as gas stations, for delivering and dispensing such products to the consumer at a location of maximum convenience.

SUMMARY OF THE INVENTION

A primary objective of the present invention is to provide a method and system for delivering and dispensing a damageable packaged product, such as a beverage or other food product, in individual containers to a consumer. It is a particular objective of the present invention to provide a system for vending a temperature maintained beverage or other food product to a customer at a non-temperature controlled location that is of greater convenience than would be a temperature controlled location at which the product is stored.

It is a further objective of the present invention to provide a potentially unattended system and method for delivering a temperature maintained beverage or other product to a consumer at a non-temperature controlled location, particularly by maintaining the product at a location that is remote from the dispensing location and is secure. It is a further objective of the present invention to provide such a system and method by which completely unattended consumer sales of products such as beverages and other food products for immediate consumption may be carried out.

It is a more particular objective of the present invention to provide a system for automatic delivery of a beverage or other food product or of another damageable product to a consumer at a location remote from a product preparation or storage location with minimal agitation or rough handling of the product. It is a still more particular objective of the present invention to carefully convey a vended product from a supply location to a remote unattended customer accessible location and preferably to do so without the use of a separate moveable protective carrier or container in the product transporting or conveying system.

According to the principles of the present invention, there are provided a method and system by which individually packaged products, particularly beverages, such as soft drinks, solid food items such as sandwiches and ice cream, and other consumable convenience products, are delivered, without manually being carried, from a storage or supply location to a customer at a vending location with minimal agitation or rough handling of the product. Further according to other principles of the present invention, a product is moved from the supply to the vending locations without the use of a carrier for the product. Preferably, the vended product is one maintained in a temperature controlled environment at a storage location that is remote from a point of sale to a consumer desiring such product for immediate consumption. With the preferred embodiment of the invention, the product is ordered and may also be paid for by the consumer at the point of sale adjacent a service counter, an outdoor access lane, which may be at a drive-up location such as a vehicle accessible gasoline pump island at a gasoline service station, or at some other goods and services vending area, such as a general store counter, a ticket counter an exercise machine, or other such location. The ordered product is delivered, in response to the order, from the storage location by way of a pneumatic tube.

In accordance with one preferred embodiment of the invention, a mechanism is provided that selects a product in response to the entry of a selection command by the consumer at the point of sale, and feeds the product in its packaging container, either by loading the packaging container into an adequately insulated and padded capsule or carrier, for delivery through the pneumatic tube, or preferably by loading the packaging container directly into the pneumatic tube, with the container appropriately configured to fit in and through the tube. The packaging container is preferably configured to form a seal with the wall of the tube, preferably in a pair of annular regions around the container periphery, facilitating the transportation of the product through the tube, with the packaging container of the product serving as the outer carrier for the product, without the need for a separate moveable capsule or carrier to further contain the packaged product for movement through the tube.

A pneumatic tube conveyor system delivers the product to the point of sale at which the product may be carefully decelerated and automatically removed from the capsule, or presented, preferably only in its packaging container, to the consumer. In the preferred embodiment of the invention, a deceleration device is provided at the delivery or dispensing location that responds passively to the approach of the product through the tube by isolating a cushion of air ahead of the approaching product and gradually exhausting the cushion to gently bring the product to rest for removal by the customer. In the specific illustrated embodiment, the deceleration device includes a valve positioned near the delivery end of the pneumatic tube at the customer location, with a bypass tube extending from a bypass port beyond the delivery position back to the valve. A floating piston lies in the tube beyond the delivery position and ahead of the bypass port. Exhaust ports are provided in the tube just beyond the valve. The approach of the product container through the tube compresses air in the delivery end of the tube and in the bypass tube, moving the floating piston forward toward the exhaust ports, preferably in an upward direction. Passage of the product through the valve causes the valve to seal off the bypass tube, trapping air behind the piston as the product container engages the piston, thus causing the piston to have a gentle braking effect on the motion of the product. Then, as the product moves further against the piston, the valve is released allowing a controlled flow of air from the bypass tube, gradually releasing the pressure behind the piston to decelerate the product to a rest position at a product delivery port of the tube. The sealing structure built into the walls of the containers is utilized to facilitate the movement of the products through the tube as well as enhancing the effectiveness of the product deceleration features of the invention.

In one preferred form of the invention, accounting for payment for the order is carried out by way of coded information identifying the user account and entered at the point of sale, for example by charging or otherwise posting the payment to an account of the customer. Preferably, a charge is made to a gasoline charge account that is identified by reading a gasoline credit card of the user in connection with the purchase of gasoline or other such product.

The advantages of the present invention include that of convenience to the consumer. They include for the convenient unattended vending of products to a customer, including the delivery of the product from a remote storage location without agitating or otherwise damaging the product. As a result, the automated vending of food, including beverages, in their own packaging containers and without a separate carrier or mechanical conveyor is achieved. In addition, the method and system of the present invention facilitate the sale of beverages and other such consumable products where sales might not otherwise take place. Such sales may also take place without an attendant being on duty to provide the product or to collect the payment for the product, because the credit charging capacity of the gas dispensing or other such operation can be utilized. Further, such product sales will command a higher price due to the additional convenience that is provided. As a result, the profitability of operating a retail facility such as a gas station is likely to be increased. With the system of the present invention, the products dispensed are protected from heat and cold, and the exchange of cash in connection with such a product's sale is avoided, thus eliminating one element of the problem of the security of the facility.

These and other objectives and advantages of the present invention will be more readily apparent from the following detailed description of the drawings of the preferred embodiment of the invention, in which:

DETAILED DESCRIPTION OF THE DRAWINGS

Figures 1, 1A, 1B:
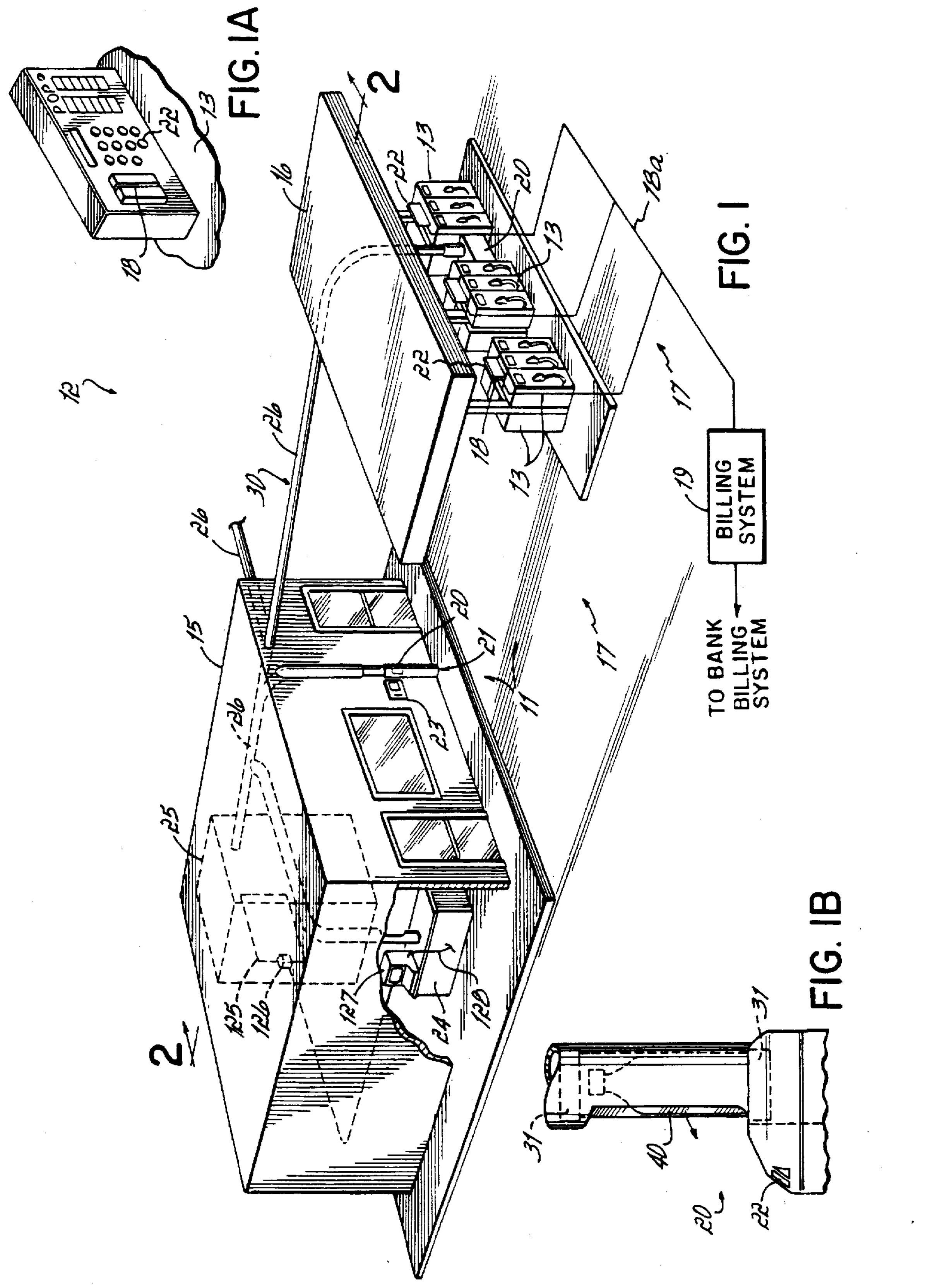
FIG. 1 is a perspective view of one preferred embodiment of a system according to principles of the present invention.
FIG. 1A is a schematic perspective view of a card reader of the system in one alternative embodiment to that of FIG. 1.
FIG. 1B is a schematic perspective view of an alternative dispensing unit of the system of FIG. 1.

FIG. 1 illustrates one preferred embodiment of the invention in the form of an automated retail system 10 that includes an automated beverage delivery and dispensing system 11 in combination with a self-service gasoline dispensing facility 12. The gasoline dispensing system portion 12 of the combination 10 typically includes a building 15 that may be an attended retail store with one or more remote outdoor gasoline pumps 13 located at one or more remote outdoor islands 16. Adjacent the store building 15 and the island 16 are provided one or more vehicle lanes 17 that render the building 15 and the pump island 16 directly accessible to the vehicles of customers. In all but ideal climates, the building 15 is usually provided with climate control such as heating and air-conditioning, while the pump island, being outdoors, is at the ambient temperature dictated by the climate.

Pump islands 16 are increasingly being provided, even in the prior art systems, with card readers 18 that are electrically interconnected with on-line banking or billing systems 19, often by way of telephone lines. With such systems, gasoline customers of the facility 12 are able to purchase gasoline without the assistance of an attendant, either to pump the gasoline or to collect the payment therefor, and can do so without leaving the vicinity of their vehicles in the lanes 17.

With the present invention, the addition of the beverage dispensing and delivery system 11 provides the capability for the gasoline customer of the facility 12 to also purchase beverages with the same convenience as is possible for the purchase of gasoline, and at the same time. This is provided by including in the system 11 one or more beverage dispensing units 20 adjacent the gas pumps 13 at each of a plurality of the gasoline pump islands 16 or at another outdoor location 21 adjacent the traffic lanes 17. Adjacent or included in the credit card reader 18 is provided a panel 22 by which the customer may add to his gasoline purchase the selection and purchase of a beverage, as illustrated in FIG. 1A. Alternatively or in addition, a separate card reader 23 may be provided at any of the dispensing units 20, for example at the unit at a location 21 that is distant from the reader 18 at the pump island 16. Such a unit 20 may have such a panel 22, so the consumer may order a beverage. Also, a dispensing unit 20 may be provided at an attended counter or indoor room temperature location 24, which is tied into a cash register payment or charge system within the building 15.

The beverage system 11 is further provided with a product supply terminal 29 that includes a temperature controlled storage vault 25 that is preferably enclosed within the store facility 15 and thereby generally refrigerated or otherwise temperature maintained at approximately 5° C. The vault 25 is interconnected with each of the dispensing units 20 by one of the pneumatic tubes 26 of a pneumatic delivery system 30 of a type more particularly illustrated in FIG. 2.

Figure 2:
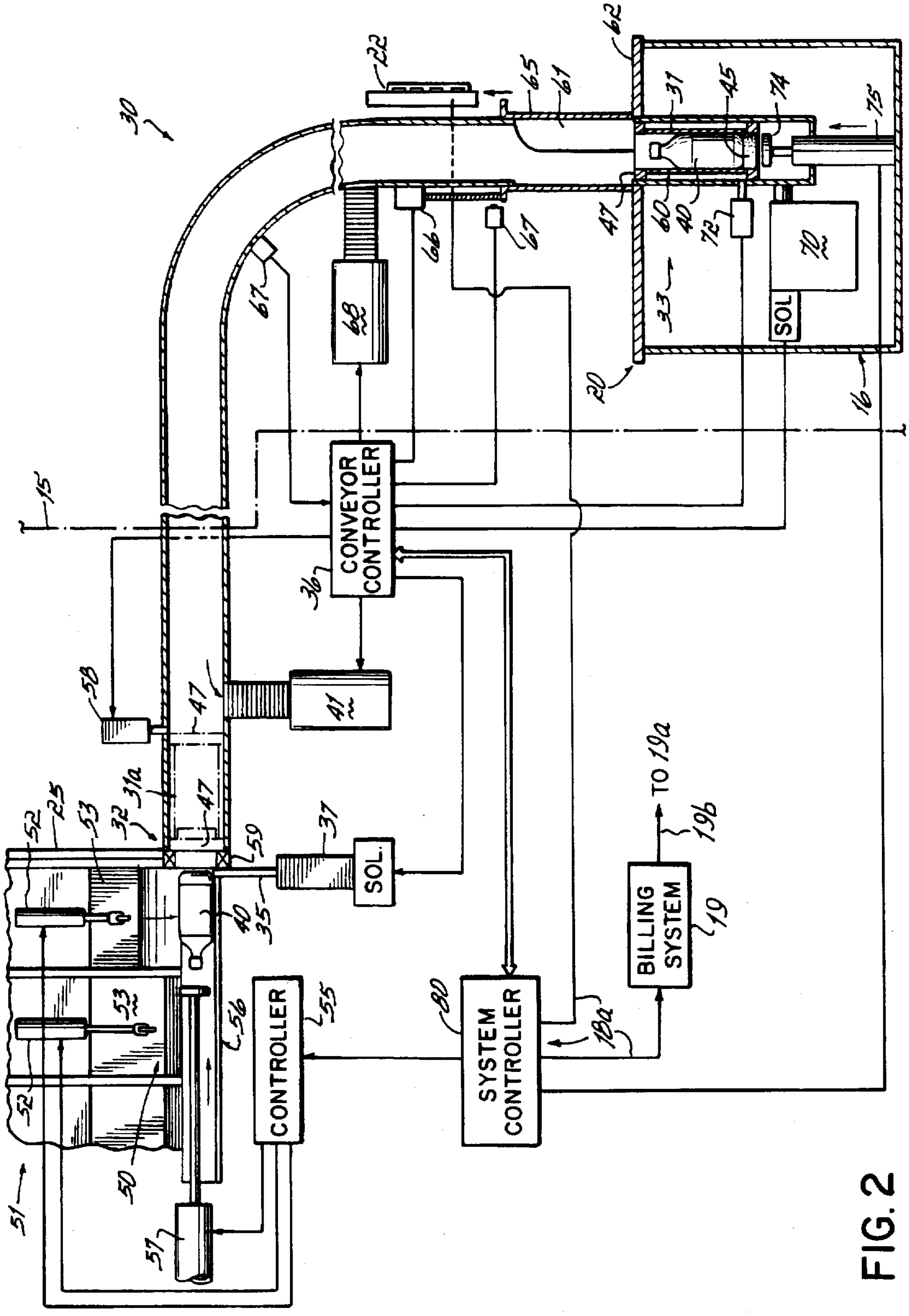
FIG. 2 is a cross-sectional view of the system of FIG. 1 along the line 2—2 of FIG. 1, illustrating, in one portion thereof, a carrier or capsule being loaded with product and, in another portion thereof, a capsule that has been delivered to the point of sale.

Referring to FIG. 2, the pneumatic delivery system 30 includes the tube 26 of generally circular cross-section, which extends from the vault or beverage storage unit 25 of the supply terminal 29 within the store building 15 and the beverage dispensing unit 20 at the gas pump island 16. Within the tube 26 is contained a carrier 31, which, during normal operation of the pneumatic delivery system 30, is not removable from the tube 26, although the carrier 31 may be removed from the tube 26 by way of a service door (not shown) in the tube 26 at one or more locations along the tube 26. The tube 26 has a single loading end 32 at the vault 25 and a single discharge end 33 at the dispensing unit 20, with only one carrier 31 per tube 26, although more than one such tube 26 may be provided to connect the vault 25 with more than one dispensing unit 20 at different outdoor or other locations.

At the loading end 32 of the tube 26, a pneumatically or electrically operable gate 35 is provided, which is operated in response to a signal from a pneumatic delivery system or conveyor controller 36 to a gate actuator unit 37. The gate 35 is moveable between an open position at which a filled beverage container 40 may be loaded from the vault 25 into the carrier 31 and a closed position that will allow a vacuum to be drawn between the gate 35 and the carrier 31 to move an empty carrier 31 from the dispensing unit 20 toward the vault 25. Such a vacuum is applied by a high volume pump 41 being operated at a vacuum. The actuator unit 37 may also be provided with valving, a pump or other devices to vent or otherwise control the pressure within the tube 26 immediately inside of the gate 35 to insure the desired motion of the carrier 31 in the portion of the tube between the gate 35 and the pump 41.

Figure 3A:
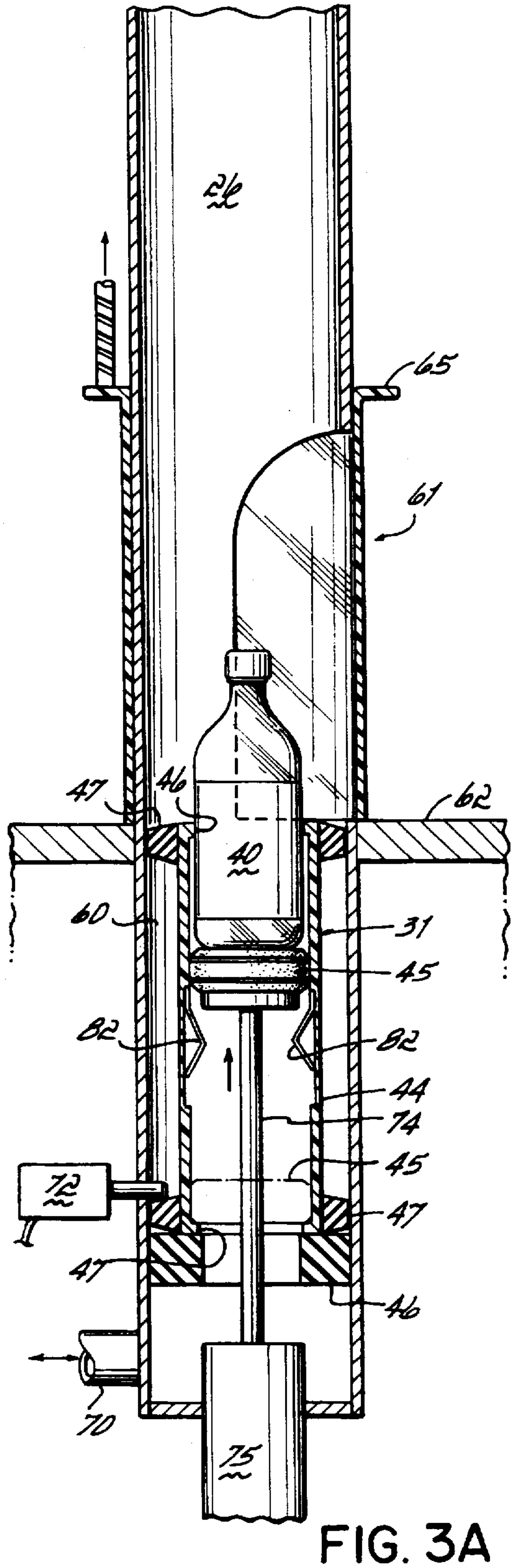
FIG. 3A is a cross-sectional view illustrating a portion of FIG. 2 with the capsule in an intermediate stage of being unloaded of product.
Figure 3B:
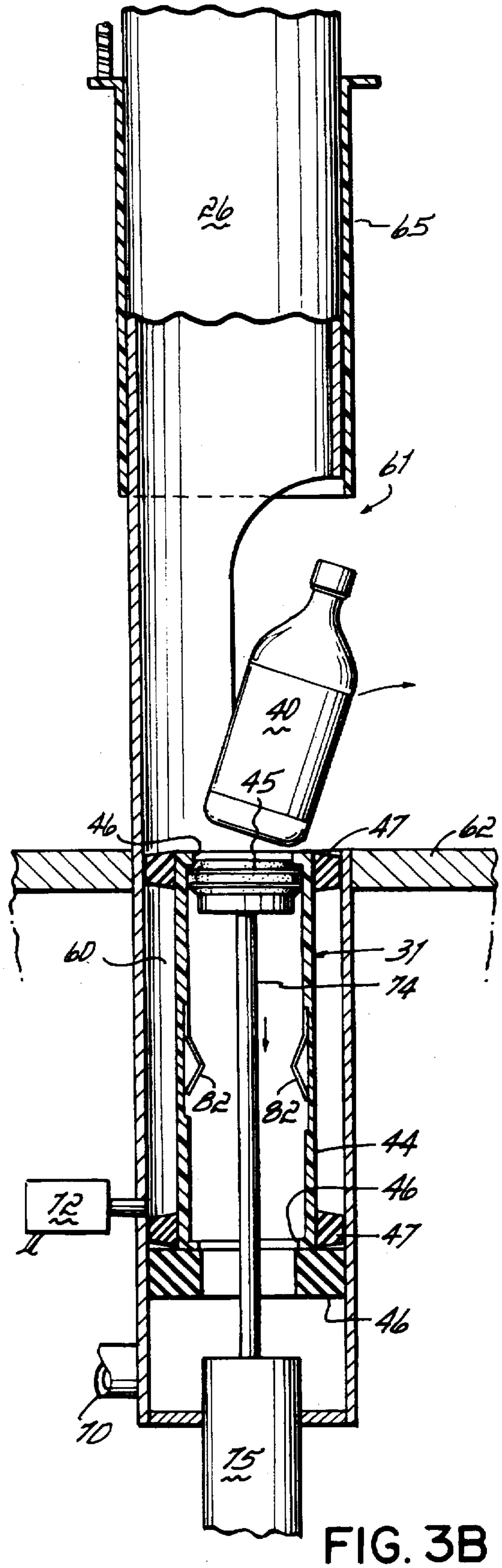
FIG. 3B is a cross-sectional view similar to FIG. 3A with the capsule in a final stage of being unloaded of product.

The configuration of the carrier 31, which is illustrated in more detail in FIGS. 3A and 3B, is formed of a cylindrical tubular body 44 formed of metal or hard plastic, which is open at both ends. The inside surface of the body 44 is formed of a padded and thermally insulative material 43. Within the body 44 is slidably mounted a circular plunger 45. The inner surface of the insulative material 43 formed of a material that is adapted to permit the plunger 45 to slide fairly freely but to form at least a moderate air seal with the body 44. The plunger 45 is contained within the body by circular stops 46 formed in the opposite ends of the body 44. The plunger 45 slides sufficiently freely in the body 44 so as to be drawn to the low pressure side of the carrier 31 and thus locate itself at the leading end of the carrier 31 as the carrier 31 is being pneumatically forced through the tube 26. At the ends of the body 44, around the outside of the stops 46, is provided a pair of annular bumpers 47, preferably of a moderately hard rubber or similarly elastic synthetic material. The bumpers 47 support the carrier 31 in a low friction slidable contact with the wall of the tube 26 and hold the body 44 in spaced relationship to the wall of the tube 26 to facilitate the movement of the carrier 31 around curves and bends in the tube 26. The plunger 45 provides both a seal to facilitate movement of the carrier 31 in the tube 26 and a support for the bottom of the container 40 in the carrier 31. The inside surface of the body 44 provides a small amount of friction force to hold a container 40 therein while the carrier 31 is moving, but not so much friction as to interfere with the loading of the container 40 into the carrier 31. In addition or in the alternative, other elements may be provided to hold the product container 40 in the carrier 31, such as pins or, as illustrated in FIGS. 3A and 3B, for example, by spring clips 82.

Referring again to FIG. 2, at the supply terminal 29, within the vault 25, is provided a mechanism 50 for feeding beverage containers 40 of any selected one of a number of types from a supply 51 to the input end 32 of the tube 26. Any one of a number of retrieving and feeding devices may be provided as the mechanism 50 to drop or robotically retrieve and place the selected container 40 into the open end 32 of the tube 26. In FIG. 2, a drop-shoot vending machine type of dispensing unit is illustrated as the mechanism 50 for simplicity, in which actuators 52 open a door 53 at the bottom of the supply 51 to individually drop one beverage container 40, in accordance with a signal from a dispenser controller 55, onto a loading trough 56, with the bottom of the container 40 facing the open end 32 of the tube 26. In this position, a loading ram 57 pushes the container 40 into the carrier 31, also in response to a signal from the dispenser controller 55.

To be loaded with a container of beverage 40, the carrier 31 must be secured in the position illustrated by the phantom lines 31 a in FIG. 2. In this position, one of the bumpers 47 will rest against a fixed bumper or stop 59 surrounding the opening at the open end 32 of the tube 26, and are of smaller diameter than the tube 26 or the bumpers 47 of the carrier 31 to trap the carrier 31 in the tube 26. In this position, a solenoid actuated locking member 56, which is activated by a signal from the conveyor controller 36, holds the carrier 31 immobile while the container 40 is being loaded into the carrier 31. During loading, of course the gate 35 is open. Also during loading, the plunger 45 may be in any position initially, but it will be forced to the end of the carrier 31 that is farthest from the end 32 of the tube 26 by the pushing of the container 40 by the ram 57. The carrier 31, with the slidable plunger is symmetrical and, with some tube configurations, can be used in either direction and loaded with containers 40 from either side.

The tube 26 usually extends horizontally from the vault 25 but may rise or fall somewhat on the way to the location of the dispensing unit 20. Approaching the dispensing unit 20, the tube 26, in the preferred embodiment, changes to a vertical orientation to enter the dispensing unit 20 from the bottom or, as shown in the illustrated embodiment, from the top. The discharge end of the tube 26 at the dispensing unit 20 is preferably closed and contains a carrier holding space 60, approximately as long as the carrier 31, that spaces the closed end 33 of the tube 26 from a delivery window 61 in the side of the tube 26. A horizontal surface 62 in the form of a counter top covers the dispensing unit 20 and aligns with the boundary between the top of the holding space 60 and the delivery window 61. The delivery window 61 faces the customer, for example, toward the window of a vehicle 64 on the access way 17, and is provided with a door or cover 65 that, when in a closed position, pneumatically seals the window 61, as in FIG. 3A, and when in an open position allows a container 40 to be removed from the tube 26, as in FIG. 3B. The door or cover 65 may be configured to open and close by vertical movement on the tube 26, or by rotational movement around the tube 26, or by hinged motion or otherwise. Preferably, the opening and closing of the door is achieved by the actuation of a door operating motor 66 in response to a signal from the conveyor controller 36. The door 65 may be made of a transparent plastic material, which is particularly desirable if manual opening of the door 65 or manual activation of the door opening actuator 66 is desired.

In the vertical portion of the tube 26, either near the end 33 of the tube 26 or, preferably, just above the delivery window 61, is an additional high volume pump 68, which is also controlled by signals from the conveyor controller 36. The pump 68 operates in cooperation with the pump 41 to move the carrier 31 back and forth between the vault 25 and the dispensing unit 20. This pump 68 may be a vacuum pump or may also be capable of operation at positive pressure. When a carrier 31 is being moved from the vault 25 toward the dispensing unit 20, the pump 68 will operate at a vacuum, at least until the carrier 31 is in a position and moving at a speed sufficient to insure that it will continue to drop by gravity toward the dispensing unit 20. The position and speed of the carrier 31 may be verified by the provision of one or more sensors, such as, for example, optical sensor 67 in the wall of the tube 26. When the carrier 31 has reached the point of the sensor 67, for example, the pump 68 and/or a pressure control unit 70, which may include one or more valves, vents to atmosphere or pumps, will be operated to insure that some pressure is provided in a sealed space in the tube 26 below the arriving carrier 31 to cushion the arrival of the carrier 31 at the dispensing unit 20, and to bring it to rest gently in the space 60 adjacent the end 33 of the tube 26.

When a carrier 31 has arrived at the space 60 containing a beverage container 40, a locking solenoid 72 is actuated in response to a signal from the conveyor controller 36 to lock the carrier 31 in position in the tube 26 so that the beverage container 40 therein can be unloaded. The unloading of the beverage container 40 is accomplished by the movement of a piston 74 of an unloading cylinder 75 that is actuated, also in response to a signal from the conveyor controller 36, as is better illustrated in FIGS. 3A and 3B. As illustrated in FIG. 3A, the actuation of the cylinder 75 extends the piston 74 upwardly into contact with the underside of the plunger 45. With the locking solenoid 72 holding the carrier 31 against movement in the space 60, the plunger 45 slides upwardly in the carrier 31, lifting the container 40 upwardly into alignment with the window 61 above the counter surface 62. When the container 40 is adjacent the window 61 with the plunger 45 aligned with the countertop 62, the door opening mechanism 66 is actuated to open the door 65 so that the container 40 can be removed by the customer, as illustrated in FIG. 3B.

An alternative structure for the pneumatic delivery system 30 may provide for the carrier 31 to have a door or opening in the tubular body 44 for the removal of the contents by the customer, as the carrier 31 presents the product at the dispensing unit 20, as illustrated in FIG. 1B. Pneumatic delivery systems that include additional details of systems such as system 30 are well known and may be utilized with the system 30 described herein.

The operation of the conveyor controller 36 and the dispenser controller 55 are coordinated and controlled in response to orders placed by customers on the panel 22 and in response to payments made by way of the entry of charge account information into the card reader 18, through a beverage delivery system or main controller 80. For example, when a gasoline customer purchases gasoline and inserts a charge card in the card reader 18, he may be prompted with a message asking if an additional purchase of a beverage is desired. If so, an order may be placed by selecting the brand and type of beverage desired by pressing a button on the panel 22. This button selection transmits the beverage order to the main controller 80 which causes the price of the order to be added to the gasoline charge made through the billing system 19 (FIG. 1) to the account identified by the card read by the card reader 18. If the carrier 31 is in the position 31*a* indicated by 31*a* indicated by the phantom lines near the loading end 32 of the in FIG. 2, the gate 35 is opened, the dispensing controller 55 is signaled by controller 80, which causes the dispensing controller 55 to activate the appropriate actuator 52 to open the door 53 to drop the selected beverage in its container 40 into the trough 56. Thereupon, the dispenser controller 55 energizes the cylinder 57 to push the dropped container 40 from the trough 56 into the carrier 40. When the controller 80 determines that the container 40 has been loaded into the carrier 31, through feedback signals from the controller 55 or through additional sensors (not shown) that may be provided, the conveyor controller 36 is signaled to initiate the transporting of the loaded carrier 31 to the dispensing station 20.

The transporting of the carrier 31 to the dispensing station or unit 20 begins with the assurance that the door 65 that covers the window 61 is closed and that the pressure control unit 70 is set to insure that the lower end of the tube 26 is sealed. Then the pump 68 is energized. The gate 35 will remain open at this time or there will be other openings to allow a venting of atmosphere to the vault side of the carrier 31. This will cause the carrier to be drawn through the tube 26 toward the pump 68. When the carrier 31 has reached the vicinity of the sensor 67 and is moving sufficiently to cause it to reach the vertical section of the tube 26, the pump 68 is turned off, allowing the carrier 31 to free fall. However, in that the lower portion of the tube 26 is sealed, pressure in the tube 26 below the carrier 31 will inhibit the fall of the carrier 31. Either by providing for appropriate sealing in the lower end of the tube 26 to allow for a controlled escape of air from the tube 26, or by operating the pressure control unit 70, which is optional, pressure can be maintained in the lower portion of the tube 26 that allows the carrier to be gently lowered to the space 60 at the lower end of the tube 26 so as to rest on a stop 81 provided there, at which point it is locked by the actuation of the lock solenoid 72 in response to a signal from the conveyor controller 36.

Then, the piston 74 is actuated to lift the container 40 on the plunger 45 to the window 61, the door 65 covering the window 61 is opened, and the beverage container 40 is removed. Thereupon, the door 65 is closed, the gate 35 at the upper end of the tube 26 is closed, the pressure control 70 is actuated to vent the lower end 33 of the tube 26 to atmosphere, and the motor 41 is operated to apply a vacuum to the tube 26. The vacuum in the tube 26 first draws the plunger 45 to the top of the carrier 31 where it rests against the stop 47. Then, the pressure differential on the plunger 45 causes the carrier 31 to be forced upwardly in the tube 26 toward the pump 41. Pump 41 is turned off as the carrier 31 approaches, allowing the carrier to continue toward the stop 59 at the end 32 of the tube 26. At this position, the carrier 31 may be stored to await another order.

Figure 4A:
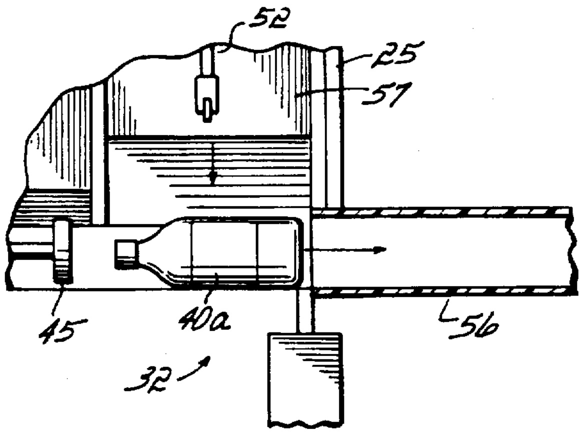
FIGS. 4A is a sectional view of a portion of FIG. 2 illustrating the loading of a beverage in its packaging container into a pneumatic tube so that the packaging container forms the carrier.

The system of the present invention can also be used without a separate carrier 31, but rather with the packaging container such as the beverage container 40 serving the function of the carrier 31. This is practical with blow molded plastic beverage bottles and other reasonably shatter resistant containers, as for example, container 40*a*, as illustrated in FIG. 4A, which shows the container 40*a* being loaded directly into the tube 26 at the loading end 32 of the pneumatic system 30 by actuation of the plunger 45. With such direct loading of the container 40*a* into the tube 26, the internal cross-section of the tube 25 must match the external cross section of the container 40*a*. Preferably, the tube 26 is configured to accept standard packaging containers, which, in a bottled beverage vending system, is usually the round cross-section of a beverage bottle.

Figure 4B:
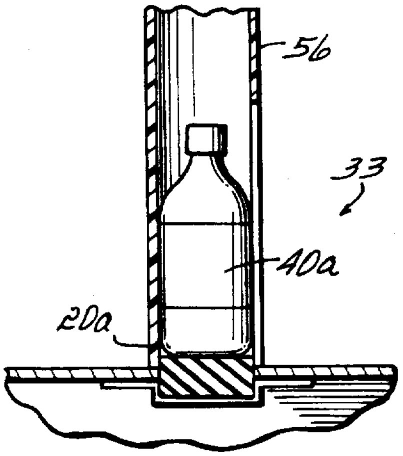
FIGS. 4B is a sectional view of a portion of FIG. 2 illustrating the delivery of the beverage of FIG. 4A in its container.

FIG. 4B illustrates the container 40*a* at a dispensing unit 20*a* at the discharge end 33 of the pneumatic system 30. Such a pneumatic system may include the air cushion decelerating feature as described above or some other structure to slow the container 40*a* upon its arrival at the dispensing unit 20*a*.

Figure 5A:
FIG. 5A is a perspective view of an alternative embodiment of the system of FIG. 1.
Figure 4C:
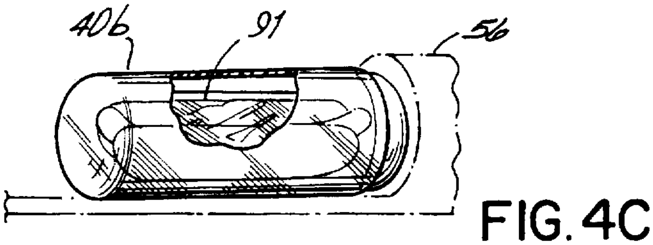
FIG. 4C is an isometric view of a food item in its packaging container for delivery through the pneumatic tube of the system of FIG. 1.
Figure 4D:
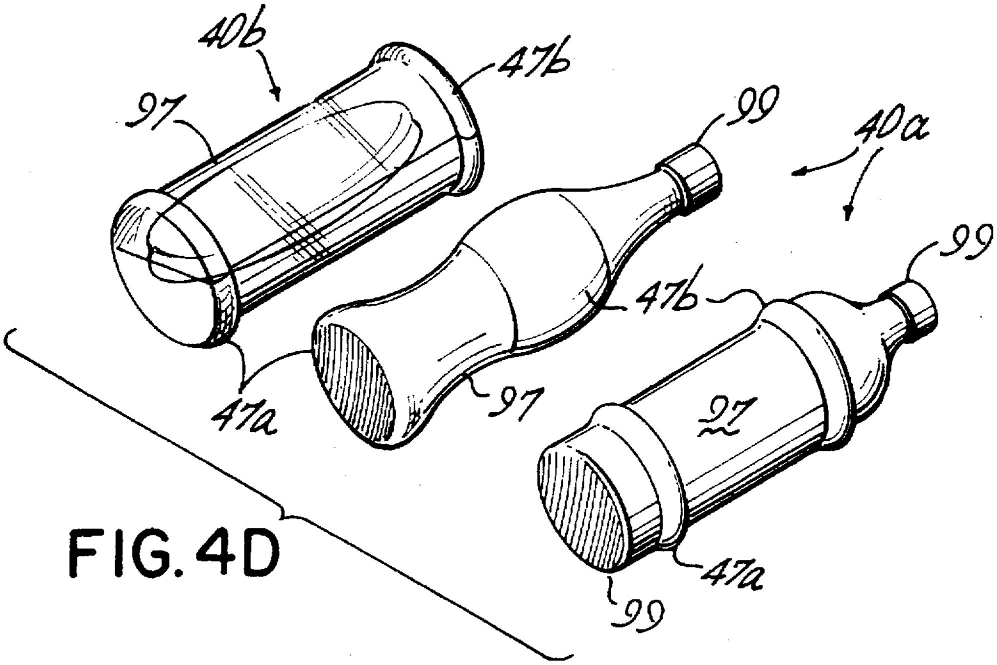
FIG. 4D is an isometric view of embodiments of product packaging containers preferred for systems such as illustrated in FIGS. 4A–4C.
Figure 4E:
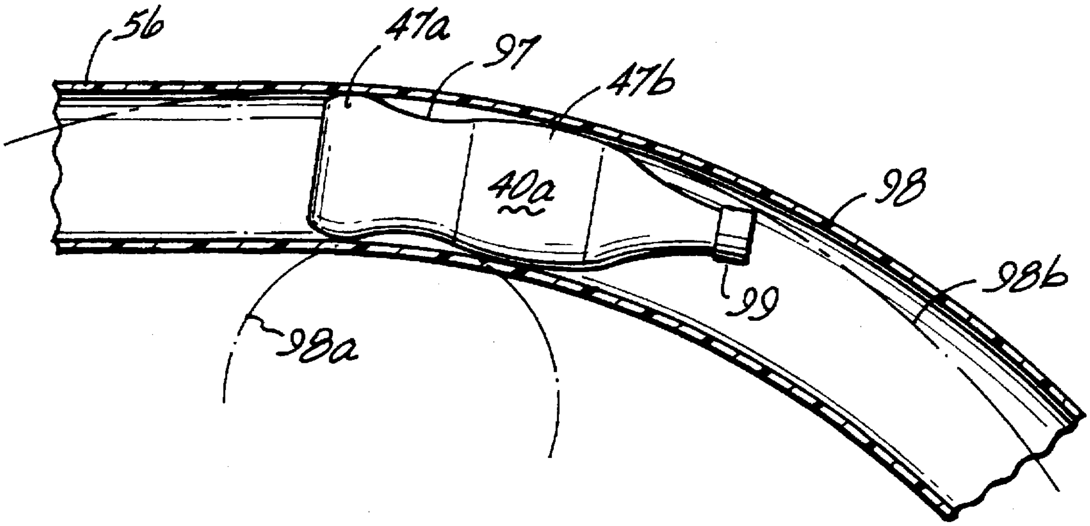
FIG. 4E is a diagram illustrating containers of FIG. 4D in a pneumatic tube.

FIG. 4C illustrates a food packaging container 40*b*, such as a plastic tubular can with a wide lid at one end, that is of the same exterior cross section as the plastic beverage container 40*a* such as illustrated in FIGS. 4A and 4B. In the container 40*b* may be provided a sandwich 91, which may be delivered heated when selected by a customer. In such system, some sort of heating unit (not shown) such as a warmer that stores the product in heated condition, or microwave unit that heats the product in response to an order. Or the sandwich may be a cold sandwich that is stored under refrigeration. The food product is dispensed and then loaded in its warmed or refrigerated condition into the tube 26 in the same manner as a beverage is loaded, as described above. Similarly, a frozen product such as ice cream or some other food product may be similarly provided. Such product may be placed in the container 40*b* in a plastic film or paper wrapping or with such other packaging material as is necessary to insure its safe delivery through the tube 26. Such food items are preferably maintained in a prepackaged condition in such container 40*b* in the storage unit 25.

Where the product is to be transported in its own packaging container, it is preferable that the container 40*a* or 40*b* be shaped so as to form two annular bumper rings 47*a* and 47*b*, as illustrated in FIG. 4D, and included in the systems illustrated in FIGS. 5A–5C, described below. The rings 47*a*, 47*b* serve a tube sealing function similar to that of the bumpers 47 of the carrier 31 in the embodiments of FIGS. 2, 3A and 3B. The rings 47*a*, 47*b* have outside diameters that are slightly smaller than, but approximately in conformity with, the internal cross-sectional diameter of the tube 56. The cross-section of a central portion 97 of the containers 40*a*, 40*b* that extends between the rings 47*a*, 47*b* should be recessed at least by a radius of curvature 98 that is nominally less than, and generally falls within an envelope 98*a* defined by the inside curvature limit of the sharpest bends of the inside of the tube 56, as illustrated in FIG. 4E. Similarly, the end portions 99 of the container 40*a*, 40*b* should also fall within an envelope 98*b* defined by the outside curvature limit of the sharpest bends of the tube 56. While two annular rings 47*a*, 47*b* are shown on each of the containers 40*a*, 40*b* of FIG. 4D, other configurations are acceptable, such as providing the center bottle 40*a* in FIG. 4D with only one ring, such as ring 47*b*, or to make the container 40*a* generally barrel shaped, where the "ring" is the widest cross-section of the container 40*a* that permits the container to move without binding around the curved sections of the tube 56.

Various forms of the beverage containers 40*a* and food containers 40*b* are illustrated in FIG. 4D. These containers 40*a*, 40*b* may be formed of a blow molded plastic or in such other manner as are formed plastic soft drink bottles or other preferably plastic containers for food and the packaging of merchandise. With such containers 40*a*, 40*b*, the rings 47*a*, 47*b* and the sections 97 and 99 of the container bodies respectively between the rings and at the ends are formed integrally of the molded wall of the container 40*a*, 40*b*.

With one or more ring sections 47, or sections of enlarged cross-section, the maximum diameter of the container 40 can be closer to that of the diameter of the tube 56, thus producing a better seal that enables a greater pressure differential to be maintained across the container 40 moving through the tube 56. With greater pressure differential maintained, the container moves more effectively through the tube 56 and is less likely to bind and rattle in the tube as a result of the more effective pneumatic force on the container. In the tube 26, the ring sections 47 are the closest portions of the containers 40 to the inside of the wall of the tube 26, generally slidably supporting the container in the tube.

While the system 10 is disclosed in a gasoline station setting, it should be appreciated that such a system can be used in combination with other vending systems. Some features of the invention can be realized in a stand-alone system for dispensing food or beverages sold independently of other products. For example, in FIG. 5A a system 10*a* is illustrated in which the pneumatic system 30 thereof has its dispensing unit 20*b* at the check-out lane of a super market. Such a system 10*a* may charge the purchase of an purchased item, such as a beverage carried in a container 40*a*, to a grocery order being accounted for at a check-out counter 95. The beverage container 40*a* utilizes a container wall configuration employing the annular seal structure 47*a* and 47*b*, discussed in connection with FIGS. 4D and 4E, above.

Figure 5B:
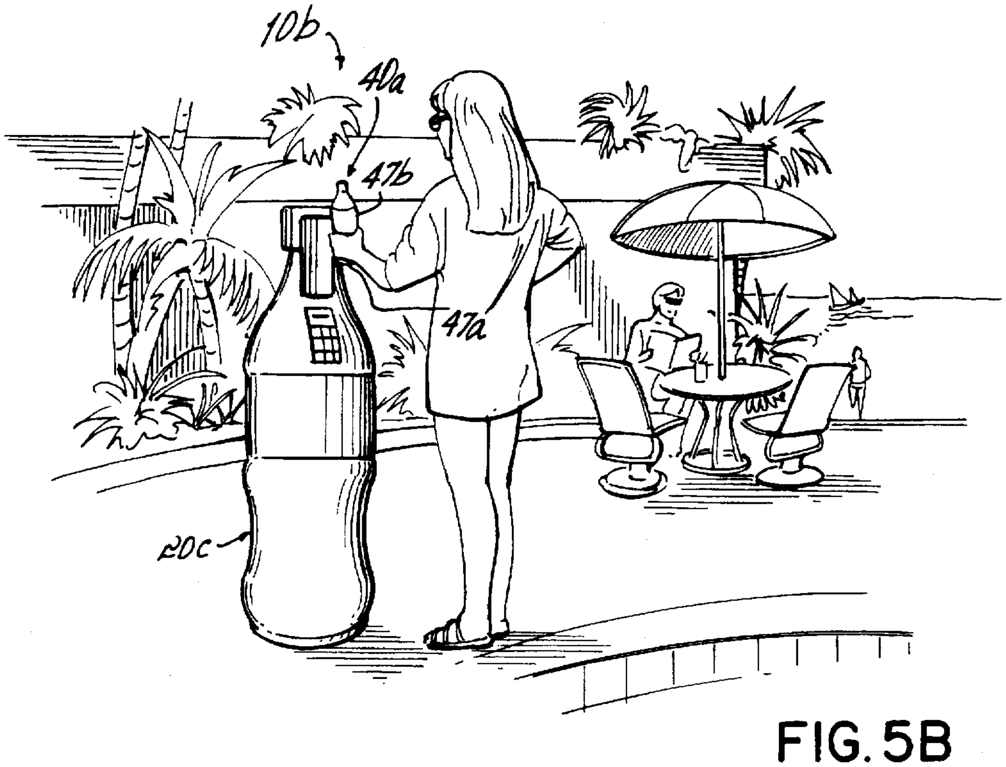
FIG. 5B is a perspective view of another alternative embodiment of the system of FIG. 1.

A further example is illustrated in FIG. 5B in which a dispensing unit 20*c* is provided in a system 10*b* at a recreational location such as a swimming pool or swimming club. Such a unit may contain its own charge card reader or, where at a membership facility or the like, accept a member code and charge the item to the member's account.

Figure 5C:
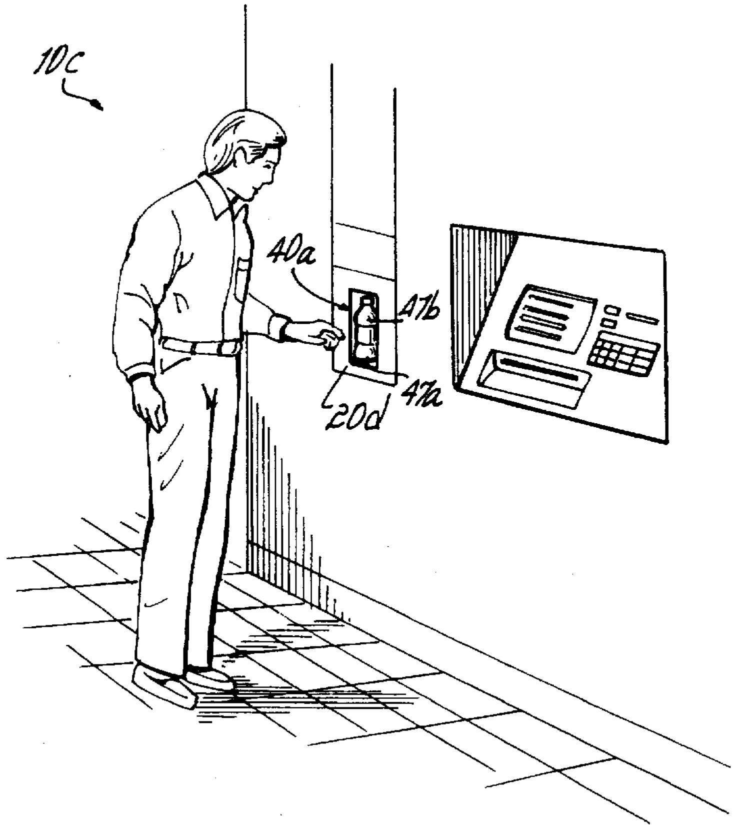
FIG. 5C is a perspective view of another alternative embodiment of the system of FIG. 1.

Further, FIG. 5C illustrates an example of a dispensing unit 20*d* of a system 10*c* that may be preferably associated with a device such as an automated teller machine or other accounting system at which an account of a customer is identified to facilitate a purchase.

Figures 6, 7A:
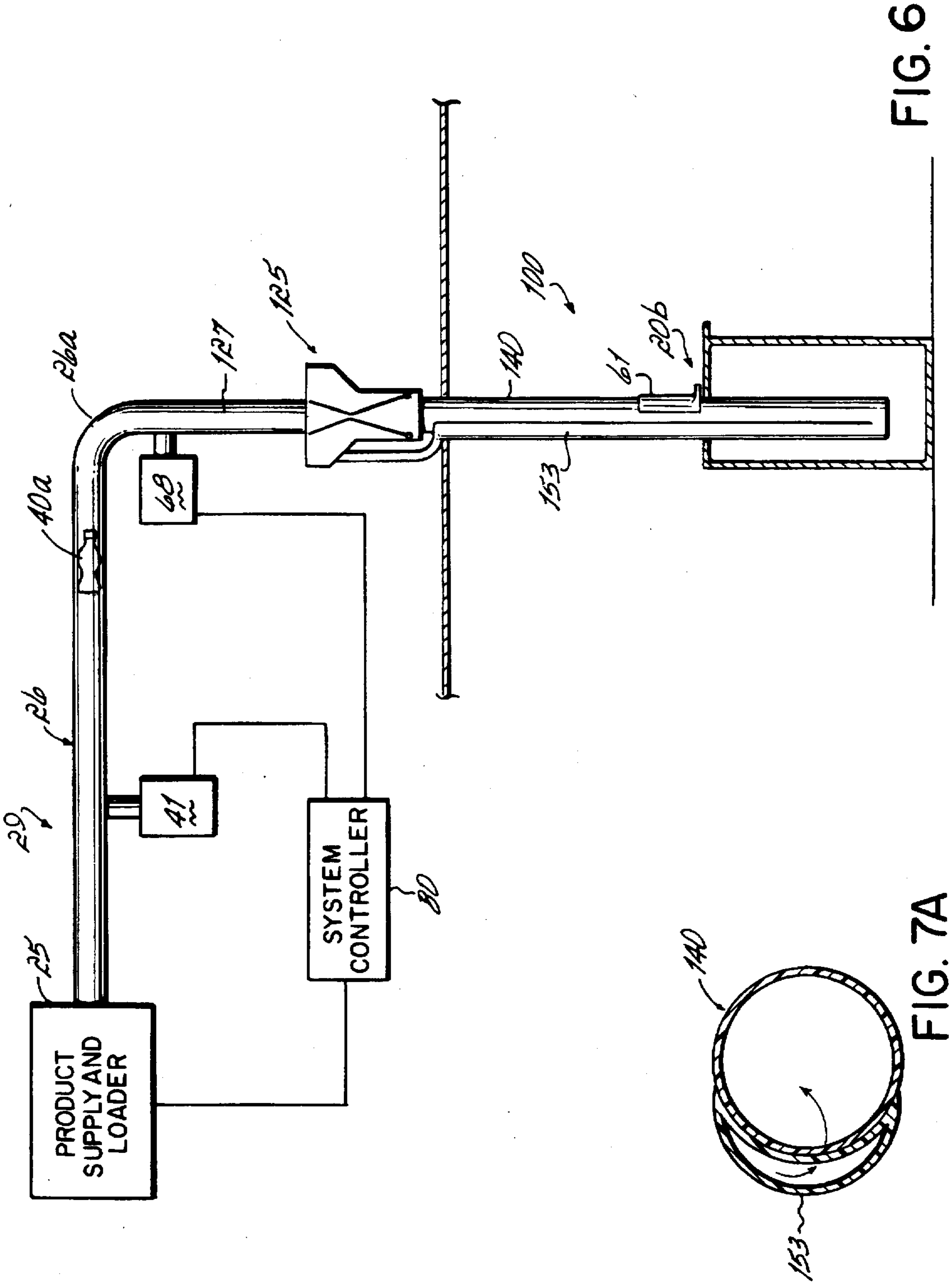
FIG. 6 is a simplified diagram, similar to FIG. 2, illustrating one preferred system having a product deceleration device according to certain principles of the present invention, illustrating its condition prior to the arrival of a product through the delivery tube to the customer terminal.
FIG. 7A is a cross-sectional view along line 7A—7A of FIG. 7.

FIG. 6 illustrates a product delivery or dispensing unit, such as unit 20*b*, configured in an embodiment that is an alternative to that of FIGS. 3A and 3B, particularly with respect to a product decelerating device 100. In FIG. 6, a product supply enclosure or vault 25 that contains the product supply and loader is connected to the inlet end of tube 26 of the pneumatic conveyor system 30. Vacuum pumps 41 and 68 are connected to the tube 26 at upstream and downstream portions thereof, respectively. The product loader and supply 25 and pumps 41,68 are shown connected to output lines of the system controller 80. The delivery end of the conveyor 30 includes the decelerating device 100 connected to the downstream or outlet end of the tube 26 and extends into the dispensing or delivery unit 20*b* of the customer terminal. The device 100 includes a passive bypass valve 125 connected in the tube 26 downstream of the downstream pump 68, preferably in a vertically downwardly descending section 127 of the tube 26. In this section 127, a product will be moved by gravity through the tube 26 toward the dispensing unit 20*b*, in absence of a pneumatic pressure differential across the product.

Figure 7:
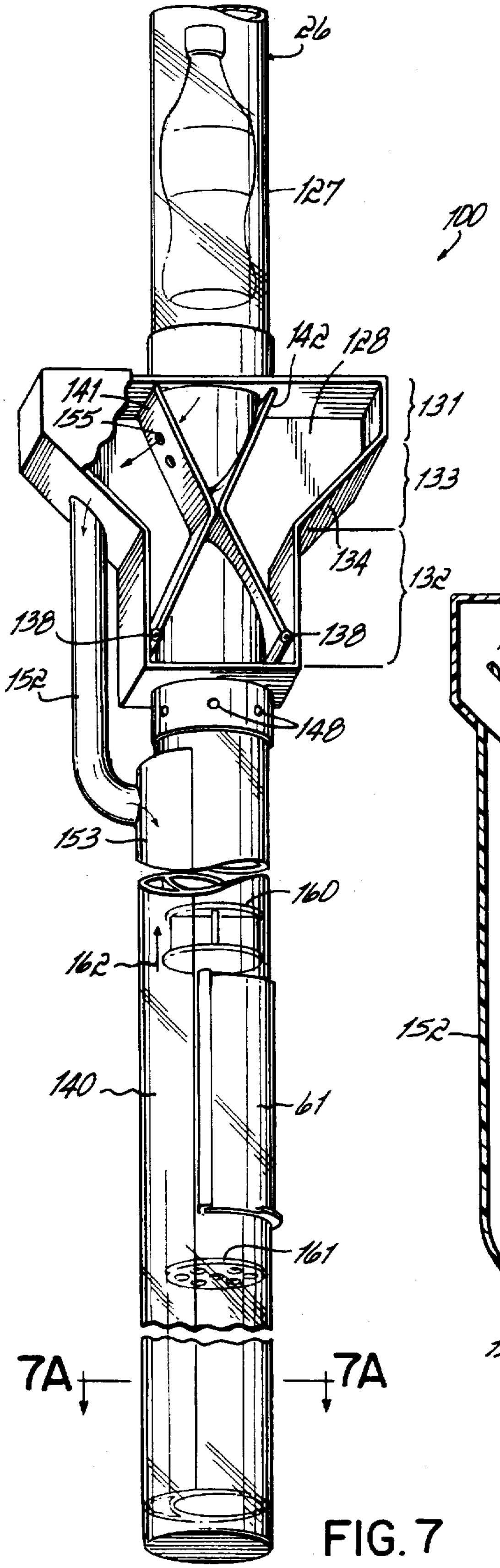
FIG. 7 is a perspective view of the deceleration device of the system of FIG. 6.

As is more particularly illustrated in FIG. 7, the valve 125 includes a chamber 128 of generally rectangular horizontal cross-section and having a wide upper portion 131, a narrow lower portion 132, and a tapered central portion 133 having generally inclined side walls 134. The chamber 128 is centered and in vertical alignment with an inlet port 135 at the top of the chamber 128 and connected to the tube 26, and a lower port 136 connected to and in vertical alignment with a vertical delivery section 140 of the tube 26. Within the chamber 128 are a pair of opposed flap valve members 141 and 142, each pivotally connected at the bottom ends 138 thereof to the wall of the chamber 128 immediately above the lower port 136 of the valve 125. The members 141,142 have an angle formed in the center thereof that is the same as the angle 144 between the side vertical walls of the lower chamber section 132 and the tapered walls 134 of the central chamber portion 133. So shaped, the members 141,142 will conform to and lie against the walls of the chamber 128 when the valve 125 is open, as illustrated in FIG. 7B.

Immediately below the lower port 136 of the valve 125, at the upper end of the delivery section 140 of the tube 26 are approximately six angularly spaced vent holes 148 that are have a cross-section effective to vent gas within the tube to atmospheric pressure at an attenuated rate. A bypass tube 150 is connected between one of the sloped walls 134 of the chamber 128 and the bottom 151 of the tube delivery section 140. The bypass tube 150 includes a section 152 of round cross-section which connects to a crescent shaped section 153 appended to the back of the delivery section 140 of the tube 26, as illustrated in FIG. 7A, opposite the product removal gate or window 61 in the dispensing or delivery unit 20*b*.

With the window 61 closed, the pressure within the delivery tube 140 remains at nearly atmospheric pressure until a container 40*a* is moved through the tube 26 and into the vertical portion 127, where, by its own momentum and the force of gravity, it pushes air before it, facilitated by the sealing action of the annular rings 47*a*,47*b* formed in the container 40*a*. The air pushed or pumped by the moving container 40*a* passes through vent holes 155 in the upper segments of the members 141,142 and through the bypass tube 150, and into the bottom 151 of the tube section 140. In the tube section 140 is provided a cylindrical floating plunger-like head 160 that is vertically slidable within the tube, but forms a generally effective seal with the cylindrical wall of the tube 140. The floating head 160 normally rests against a retaining grid 161 near the bottom end 151 of the tube delivery section 140. The members 141,142 are provided with bias springs 163, at the pivot points 136 that are sufficiently strong to hold the members together, as illustrated in FIG. 7, against any pressure differential that may develop by the air flowing across the vent holes 148 as the container 40*a* approaches the valve 125. The head 160, however, is sufficiently moveable in the tube 140 so as to move upwardly, as indicated by arrow 162, in the tube 140, as pressure develops through holes 155 and bypass tube 152 at the bottom of the tube 140 below the floating head 160, lifting the head 160 against the atmospheric pressure in the tube 140 above the head 160 due to the venting through holes 148 to the outer ambient pressure environment.

Figure 7B:
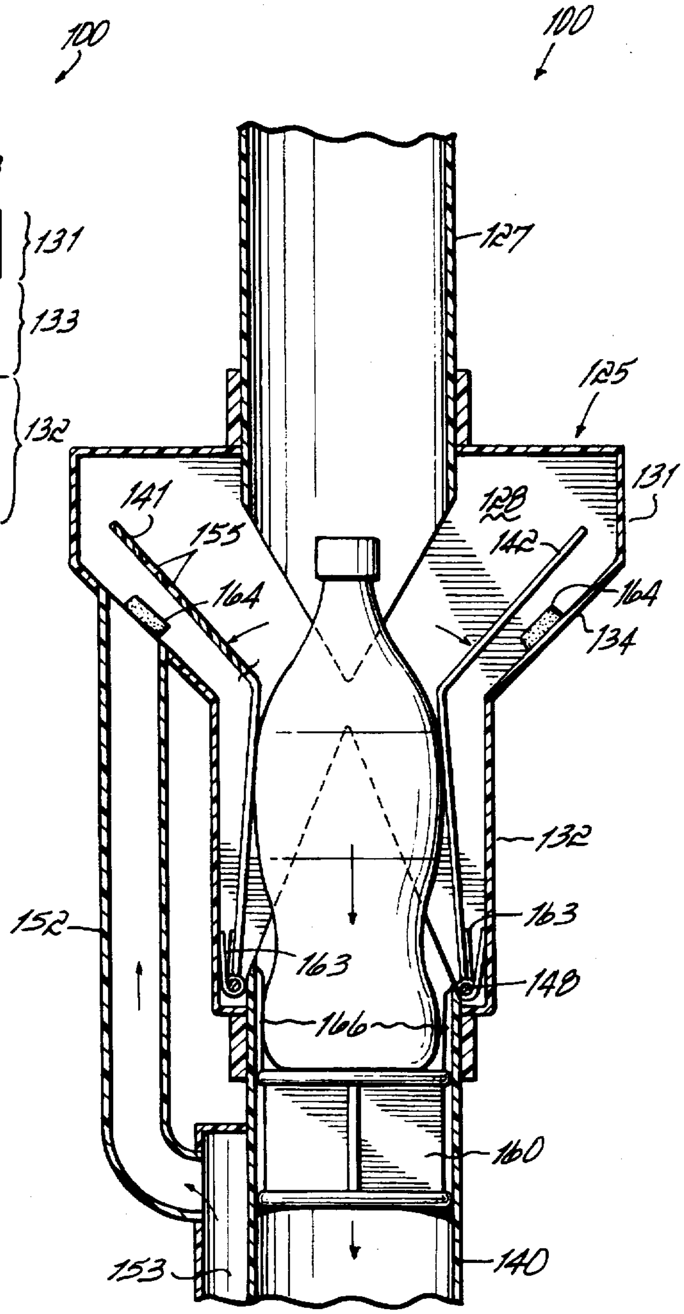
FIG. 7B is a perspective view of a portion of the deceleration device of FIG. 7 after a product has entered the deceleration valve.

The tapered wall portions 134 of the valve 125 include a pair of stopper pads 164, which are positioned to close the holes 155 in the members 141,142 as the members pivot against the pads 164, as illustrated in FIG. 7B. As the container **40*b* filled with a beverage enters the valve 125, as FIG. 7B shows, the members 141,142 are cammed apart, bringing the holes 155 into contact with the pads 164, sealing the bypass tube 150 from the top. In the meantime, the head 160 will have moved against a stop ring 166 immediately below the holes 148 near the lower valve port 136. The container 40*a* continues to move downwardly against the head 160, supported on the air pressure beneath the plunger or head 160 in the tube section 140, causing the head 160 to move downwardly against the pressure in the tube section 140 while decelerating the container 40*b*. As the container 40*a* moves out of the valve 125, the members 141,142 are urged together and away form the pads 164, thus opening the holes 155, and allowing the air in the tube 140 to escape through the bypass tube 150, permitting the pressure to be drop on the underside of the head 160. The container 40*a* thereupon gently descends as the head 160 gently settles against the grid stop 161 below the window 61, presenting the product in its container 40*a* at the window 61 for removal by the customer, as illustrated in FIG. 70**.

The deceleration device 100 and the containers **40*a* and 40*b* having the integral annular seals 47*a*,47*b* facilitate the automatic pneumatic delivery of beverages and other food products, and other products such as those that would be damaged by less gentle handling than described above. The deceleration device 100 derives the energy needed to develop back-pressure ahead of the container 40 arriving at the customer terminal from the kinetic energy of the moving product in the tube 26, which pressure is used to slow and stop the container. In the preferred embodiment described above, this is achieved positively and reliably by the use of a passively controlled mechanical valve 125, that is activated by contact by the moving container 40**.

While such a device is preferred, in the alternative, a sensor could be employed to detect the arrival of the container 40 at the valve 125 and the valve could then be actively controlled by energizing a solenoid, pneumatic cylinder or other element to cause the valving to be affected to route the pressurized air through the backup tube 150 and to seal off the tube 150 at the proper times. Further, a separate air supply could be employed to develop the back-pressure, rather than using the moving container to provide the pressurized air. However, using the container 40 to develop the back-pressure removes energy form the moving container and thus contributes to the deceleration of the product.

Figure 7C:
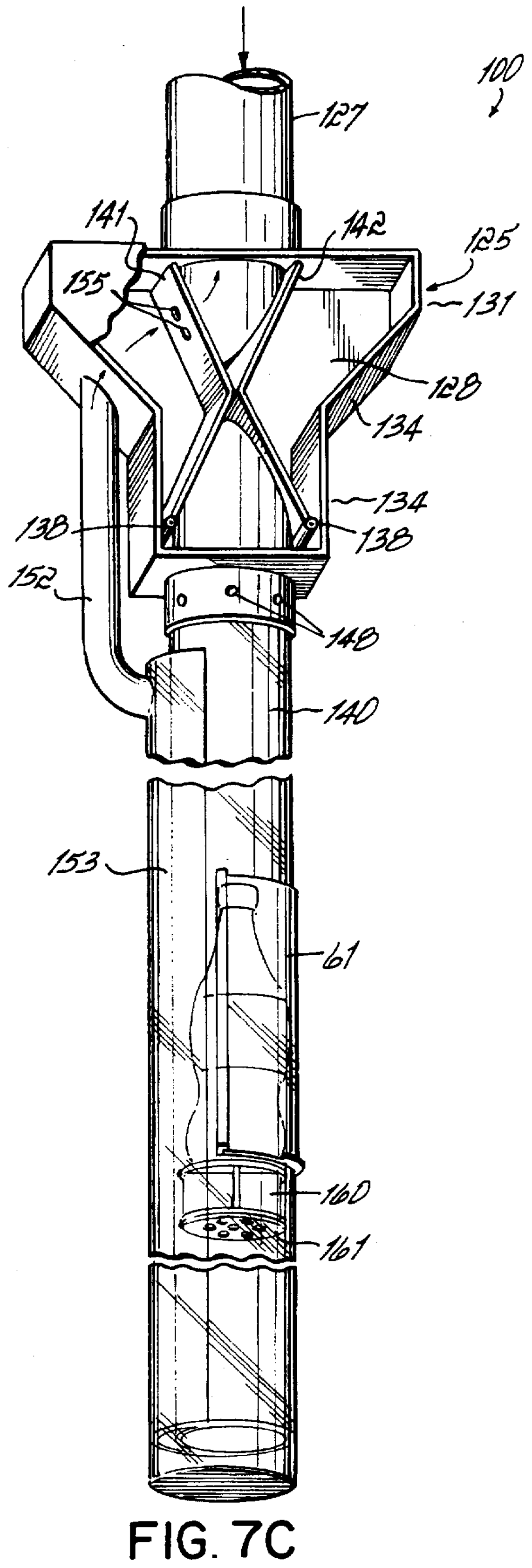
FIG. 7C is a perspective view, similar to FIG. 7 illustrating a product at its delivery position at the customer terminal.
Figure 8:
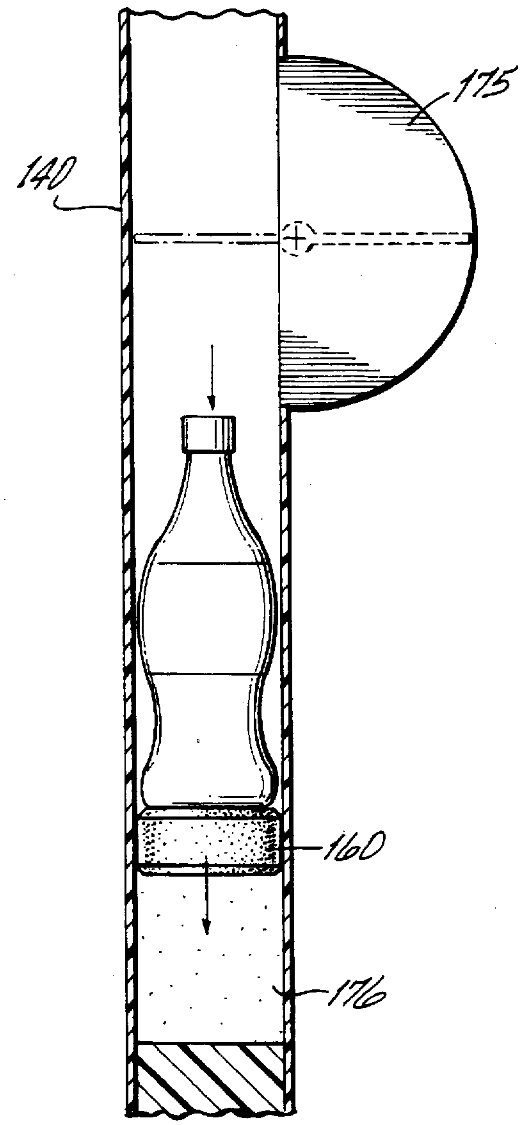
FIG. 8 is a perspective view illustrating an additional or alternative valve arrangement for use in a deceleration device.

In addition, or in the alternative, a gate-type valve 175 can be used, as illustrated in FIG. 8, and activated to block the tube behind a container 40 as the container passes, thereby creating a vacuum behind the advancing container 40 to provide the negative pressure to brake the motion of the container 40. The use of some positive pressure ahead of the product, however, is preferred to generate the back-pressure to decelerate the product. In the embodiment of FIG. 7C, the members 141,142 are configured to have a sealing effect when in contact with each other and between their edges and the parallel end walls of the chamber 128, thereby facilitating the development of a vacuum in the space 176 between the members 141,142 and the product in the container 40.

An advantage of using the separate floating head or plunger 160, rather than only the container 40, is that a plunger can be provided that forms a seal with the wall of the tube that is tighter than can be provided between the tube 26 and the container 40 alone. A tighter fit of the container 40 with the wall of the tube 26 will inhibit low friction motion of the container 40 through the tube 26 and will restrict the ability of the container 40 to round the bends of the tube. The tighter fit between the tube 26 and the plunger 160 provides more effective and predictable braking of the motion of the container 40, thus avoiding occasionally excessive impact of the product at the final stop 161 due to insufficient deceleration or bouncing of the product due to too much deceleration. The preferred embodiment presents a passive deceleration device, which is reliable, economical and easy to control.

In operation, after being loaded into the leading end of tube 26 at the loading station 29 in response to a signal from the controller 80, a product such as a beverage in a container **40*a* in the form of a plastic beverage bottle, for example, will move through tube 26 under a pressure gradient in the downstream direction imposed by vacuum pump 68, as illustrated in FIG. 6. The product will pass around a bend or curved portion 26*a* of the tube 26, with the annular ring portions 47 of the bottle 40*a* permitting the bottle to move freely around the bend and through the tube while maintaining effective sealing contact with the wall of the tube 26. As the bottle passes the pump 68, a sensor (not shown) may signal the controller 80 to turn off the motor 68**.

The beverage filled container **40*a* will then proceed, under its own momentum and under the pull of gravity, downward in the tube 26, as illustrated in FIG. 7. So moving, the kinetic and gravitational energy of the moving container is partially expended against the pressure of the air in the tube beneath the container 40*a*, increasing the pressure below the container 40*a* in the tube 26. At this point the members 141,142 of the valve 127 are closed and the disc 160 is resting on the grid stop 161 in the lower portion 140 of the tube 26. Air under increasing pressure in the tube 26 below the bottle 40*a* thereupon flows through the holes 155 in the members 141,142, and through bypass tube 150, increasing the pressure below the disc 160 and lifting the disc 160 as the air above the disc 160 remains at ambient pressure, being vented to atmosphere through holes 148 in the lower part 140 of the tube 26 at base of the valve 125. The disc 160 moves toward and against the stop ring 166 as the container 40*a* approaches the top of the valve 125, as the pressure below the container 40*a* and below the disc 160** approaches a maximum, as illustrated in FIG. 7B.

As the container **40*a* enters the valve 125, it contacts the upper portion of the members 141,142, camming them apart, also as illustrated in FIG. 7B, causing the pads 164 to block the holes 148, trapping the air in the bypass tube 150 and in the space in the tube 140 below the disc 160, as the container 40*a* contacts the disc 160. The disc 160, with the pressurized air beneath it, thereupon elastically increases to a maximum force on the bottom of the container 40*a*, which increases the deceleration of the container 40*a*, as the container 40*a* continues to move downward. Immediately upon the downward movement of the container 40*a* and disc 160 from the position shown in FIG. 7B, the members 141,142 move together under the force of springs 163, opening the holes 155 into the valve 125 and the upper portion of the tube 26. This gradually reduces the pressure in the lower portion 140 of the tube 26 and allows the disc 160 to gently lower the container 40*a* onto the stop grid 161, presenting the beverage product in its container 40*a* at the window 61 of the customer terminal 20*b***.

Those skilled in the art will appreciate that there are many uses of the present invention and that the invention is described herein only in preferred embodiments. Accordingly, additions and modifications can be made without departing from the principles of the invention. Therefore, the following is claimed:

1. A method of vending a packaged product comprising the steps of:

receiving a signal at a product supply terminal from a remotely located customer terminal;

loading, at the product supply terminal, in response to the signal, from the customer terminal, a packaged product into an inlet end of a tube of a pneumatic conveyor; then pneumatically conveying the product through the tube to the customer terminal; then developing pneumatic back-pressure behind a floating element that forms a slidable seal with the tube ahead of the moving container with the floating element in an upstream position in the tube; and then gradually releasing the back-pressure as the product moves against the element and the element moves with the product toward a downstream position in the tube to apply a gradually decreasing upstream force on the element until the product comes to rest at the customer terminal.

2. The method of claim 1 further comprising the step of:

transitioning from the back-pressure developing step to the back-pressure releasing step in response to location of the product in the vicinity of the customer terminal.

3. The method of claim 2 wherein:

the transitioning step includes the step of operating a valve in the tube with the presence of the container.

4. The method of claim 1 wherein:

upon the approach of the product in the vicinity of the customer terminal, developing the pneumatic back-pressure ahead of the product from energy of the product moving in the tube.

5. The method of claim 1 wherein:

the pneumatic back-pressure developing step includes the step of bypassing air from ahead of the product to behind the floating element.

6. The method of claim 5 wherein:

the bypassing step is responsive to the presence of the container at a location in the tube.

7. The method of claim 5 wherein:

the back-pressure releasing step is responsive to the location of the container in the tube.

8. The method of claim 1 wherein:

the loading step includes the step of loading the product, packaged in a molded plastic container having the at least one outwardly extending annular portion formed therein, into the inlet end of the tube with at least one annular portion forming a general seal with the inside of the tube;

the conveying step includes the step of applying pneumatic pressure across the container to move the product through the tube with the annular portion in close proximity to the inside of the tube.

9. A method of vending a packaged product comprising the steps of:

providing a molded plastic container having outwardly extending annular portions formed therein and having a body having a middle portion of a nominal diameter, the outwardly extending annular portions including two rings located on opposite sides of the middle portion and having diameters larger than the nominal diameter;

the container further being provided having a bottom end with one of the annular rings located proximate thereto, and an openable top end of a diameter less than the nominal diameter with the other of the annular rings being located between the middle portion and the top end; then loading a packaged product in the container with at least one annular portion forming a slidable and general seal in proximity with the inside of the tube; then pneumatically conveying the product through the tube to a customer terminal by applying pneumatic pressure across the container to move the product through the tube with the at least one annular portion of the container in close proximity to the inside of the tube.

10. A product dispensing system comprising:

a product supply;

a product dispensing unit remote from the product supply;

a pneumatic conveyor having a product delivery tube extending from the product supply and the product dispensing unit;

a deceleration device at the product dispensing unit including a floating element slidably mounted in, and forming a slidable seal with, the tube; and means for developing pneumatic back-pressure behind the floating element to decelerate a product moving thereagainst.

11. The system of claim 10 wherein:

the back-pressure developing means includes a bypass valve at the dispensing unit in the tube ahead of the floating element, and a bypass tube extending from the valve to behind the floating element.

12. The system of claim 11 wherein:

the back-pressure developing means further includes means for actuating the valve to develop bypass air from the valve to behind the floating element in response to the presence of a product at a location in the product delivery tube.

13. The system of claim 12 wherein:

the actuating means includes a camming member moveable upon contact by a product moving in the tube at the valve.

14. The system of claim 10 further comprising:

a product moveable through the product delivery tube and having a packaging container having at least one outwardly extending annular portion formed therein in slidable sealing contact with the delivery tube.

15. The system of claim 11 wherein:

the bypass valve includes a camming member moveable upon contact by a product moving in the tube at the valve.

16. The system of claim 11 wherein:

a product moveable through the product delivery tube and having a packaging container having at least one outwardly extending annular portion formed therein in slidable sealing contact with the delivery tube.

17. A product dispensing system comprising:

a product supply;

a product dispensing unit remote from the product supply;

a pneumatic conveyor having a product delivery tube extending from the product supply and the product dispensing unit;

a deceleration device at the product dispensing unit including a floating element slidably mounted in, and forming a slidable seal with, the tube;

a bypass valve at the dispensing unit in the tube ahead of the floating element; and a bypass tube extending from the valve to behind the floating element.

* * * * *